United States Patent
Deck et al.

(10) Patent No.: US 7,319,922 B2
(45) Date of Patent: *Jan. 15, 2008

(54) PROTECTIVE DEVICE AND METHOD FOR INSTALLATION OF A PROTECTIVE FUNCTION IN A PROTECTIVE DEVICE

(75) Inventors: Bernhard Deck, Weilheim (DE); Franz Zurfluh, Brugg (CH); Michael Stanimirov, Trimbach (CH)

(73) Assignee: ABB Research Ltd, Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/702,729

(22) Filed: Nov. 7, 2003

(65) Prior Publication Data
US 2004/0169984 A1    Sep. 2, 2004

(30) Foreign Application Priority Data
Nov. 15, 2002    (EP) ................... 02405984

(51) Int. Cl.
*G05D 11/00* (2006.01)
(52) U.S. Cl. .......................... 700/292; 361/1
(58) Field of Classification Search ........ 700/292–294, 700/90, 286; 361/62, 1, 115
See application file for complete search history.

(56) References Cited

U.S. PATENT DOCUMENTS

| | | | | |
|---|---|---|---|---|
| 5,166,887 A * | 11/1992 | Farrington et al. | ......... | 700/293 |
| 6,167,329 A * | 12/2000 | Engel et al. | ............... | 361/93.2 |
| 6,175,780 B1 * | 1/2001 | Engel | ......................... | 700/293 |
| 6,230,307 B1 * | 5/2001 | Davis et al. | .................. | 716/16 |
| 6,239,960 B1 * | 5/2001 | Martin | ......................... | 361/86 |
| 6,271,759 B1 * | 8/2001 | Weinbach et al. | .......... | 340/635 |
| 6,285,917 B1 * | 9/2001 | Sekiguchi et al. | .......... | 700/239 |
| 6,442,452 B1 * | 8/2002 | Kopke | ........................ | 700/292 |
| 6,469,629 B1 * | 10/2002 | Campbell et al. | ........... | 340/635 |
| 6,697,240 B2 * | 2/2004 | Nelson et al. | ................. | 361/64 |
| 6,739,145 B2 * | 5/2004 | Bhatnagar | ..................... | 62/127 |
| 6,753,772 B2 * | 6/2004 | Winkler | ...................... | 340/511 |
| 6,788,512 B2 * | 9/2004 | Vicente et al. | ............. | 361/93.1 |

(Continued)

FOREIGN PATENT DOCUMENTS

DE    197 22 898    12/1998

(Continued)

*Primary Examiner*—Alexander Kosowski
(74) *Attorney, Agent, or Firm*—Buchanan Ingersoll & Rooney PC

(57) ABSTRACT

A protective device for an electrical power distribution network has: means for processing measured values from measurement appliances for the power distribution network, means for initiating switching commands by means of primary appliances for the power distribution network, as well as a programmable protective function which, when it is carried out, determines the switching commands on the basis of the measured values. In this case, the protective device has programmable logic, which can be programmed in order to carry out the protective function. A method for installation of a programmable protective function in a protective device for an electrical power distribution network has the following steps:
- transmission of a description of the protective function in the form of a description of a hardware design via a communication link to the protective device,
- programming of programmable logic in the protective device on the basis of the description of the protective function, and
- carrying out the protective function by means of the programmable logic.

16 Claims, 2 Drawing Sheets

U.S. PATENT DOCUMENTS

| | | | |
|---|---|---|---|
| 6,816,758 B2 * | 11/2004 | Maxwell et al. | 700/292 |
| 6,842,669 B2 * | 1/2005 | Bednar et al. | 700/292 |
| 2001/0034568 A1 * | 10/2001 | Egolf et al. | 700/292 |
| 2002/0046246 A1 * | 4/2002 | Wright et al. | 709/206 |
| 2002/0052844 A1 * | 5/2002 | Schoop | 705/41 |

FOREIGN PATENT DOCUMENTS

| | | |
|---|---|---|
| EP | 1 189 324 | 3/2002 |
| WO | 00/48281 | 8/2000 |

* cited by examiner

PROTECTIVE DEVICE AND METHOD FOR INSTALLATION OF A PROTECTIVE FUNCTION IN A PROTECTIVE DEVICE

DESCRIPTION

1. Technical Field

The invention relates to the field of system design, in particular to system design for high-voltage, medium-voltage or low-voltage switchgear assemblies. It relates to a protective device as claimed in the precharacterizing clause of patent claim 1, and to a method for installation of a protective function in a protective device for an electrical power distribution network as claimed in the precharacterizing clause of patent claim 8.

2. Prior Art

A system, in particular a high-voltage or medium-voltage switchgear assembly, is controlled by means of a distributed assembly control system comprising field control devices, which are connected to one another via communication buses. An assembly control system has, for example, field control devices and a control station, as well as various communication buses and bus couplers. The controllers control, regulate, monitor and protect primary appliances in the system, which carry out the actual system purpose. Primary appliances are, for example, circuit breakers, isolators, overhead lines, transformers, generators or motors.

Protective functions monitor the correct operation of the system. Generally known protective functions for electrical networks are, for example, overcurrent protection, distance protection or differential protection on the basis of current or phase signals. If, for example, a fault such as a short circuit is detected, then one line is typically disconnected from the network. Faults resulting from external influences or a failure of a system part must be detected with a very high degree of reliability. In some applications, however, it is absolutely essential in this case to avoid disconnections resulting from incorrectly identified faults. In order to satisfy these contradictory requirements, appropriate protective functions are very complex and require a large amount of development effort. Less complex protective functions are sufficient for other applications.

Protective devices have means for processing measured values from measurement appliances for the power distribution network, as well as means for initiating switching commands by means of primary appliances for the power distribution network. Protective functions are implemented by means of computer programs, which are installed in the protective device and are carried out by means of a program-controlled microprocessor, with the switching commands in this case being determined on the basis of the measured values. The costs for a protective device are dependent on the costs for the installed protective function, the complexity of the hardware and the complexity of the configuration of a specific protective application. Protective devices are designed and optimized for one specific function, and cannot be used in a flexible manner.

DESCRIPTION OF THE INVENTION

The object of the invention is therefore to provide a protective device, a substation and a method for installation of a programmable protective function in a protective device for an electrical power distribution network of the type mentioned initially, and which allows flexible use of the protective device.

This object is achieved by a protective device, a substation and a method for installation of a protective function in a protective device for an electrical power distribution network having the features of the independent claims.

The protective device according to the invention for an electrical power distribution network thus has programmable logic for carrying out a protective function.

This allows flexible use of the device with a high performance at the same time, as is required for protective devices. There is no longer any urgent need for a microprocessor operating system with a real-time capability for time-critical protective applications.

In one preferred embodiment of the invention, the programmable logic is programmed to carry out a first protective function, and the protective device has means for programming the programmable logic in order to carry out a second protective function instead of the first.

During the course of the life of a switchgear assembly and of the associated protective devices, the requirements for protection may change. For example, the power being transmitted may be increased, or the safety requirements of the network operator may change. According to this embodiment of the invention, it is possible to reprogram the programmable logic even after installation of the protective device in the switchgear assembly, on the basis of a description of the second protective function, and for the device thus to be used flexibly and in accordance with changing requirements of a system operator.

In a further preferred embodiment of the invention, the protective device has means for receiving a description of the protective function via a communication link from a remote function server, and means for loading the description in the programmable logic. Matched protective functions can thus be installed in a remotely controlled manner according to the invention, resulting in simplification in comparison to installation on site by a servicing technician.

Further preferred embodiments are described in the dependent patent claims.

BRIEF DESCRIPTION OF THE DRAWINGS

The subject matter of the invention will be explained in more detail in the following text with reference to preferred exemplary embodiments which are illustrated in the attached drawings, in which.

Reference symbols which are used in the drawings, and their meanings, are listed in summarized form in the list of reference symbols. In principle, identical parts are provided with the same reference symbols in the figures.

APPROACHES TO IMPLEMENTATION OF THE INVENTION

Figure 1:
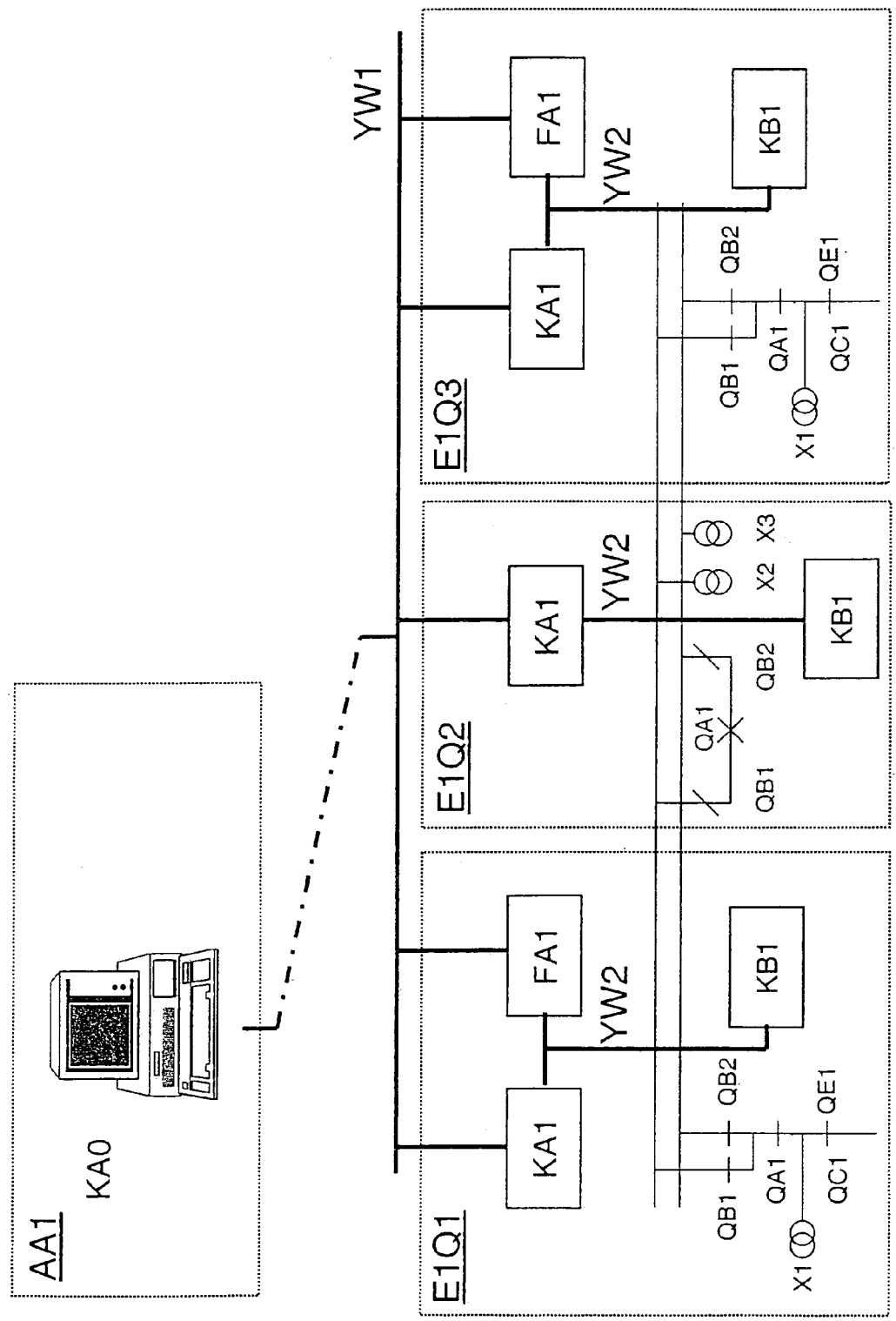
FIG. 1 shows a schematic illustration of a switchgear assembly and of an associated control system.

FIG. 1 shows a schematic illustration of a switchgear assembly or substation for an electrical power distribution network, and an associated control system. The illustration shows three fields E1Q1, E1Q2 and E1Q3 of a switchgear assembly, and a control station AA1 with a data processing appliance KA0 with conventional input and output means for operation by a user. The control station AA1 is arranged in the substation itself, or is arranged remotely in a control center of a network operator, and is connected via a communication network to a higher-level bus YW1 for the substation. The individual fields E1Q1, E1Q2 and E1Q3 each have control devices, which are controllers KA1, protective devices FA1 or input/output appliances KB1.

The designations KA1, FA1, KB1, YW1, etc., denote actual appliances and control system functions for a system. In order to denote a specific appliance uniquely, it is preceded by the designation of the field. Thus, for example, E1Q1QA1 denotes a switch QA1 for the field E1Q1.

Control system functions for controlling and monitoring the primary appliances are installed in the control devices. The control devices are connected to one another by communication means, in the example by means of the higher-level bus YW1 and by process buses YW2. The control system functions are associated with primary appliances such as switches QA1, isolators QB1, QB2 and voltage sensors or voltage measurement appliances X1, X2, X3. The primary appliances are connected to one another by means of electrical connections that carry power, that is to say, for example busbars, field nodes and outgoers.

Figure 2:
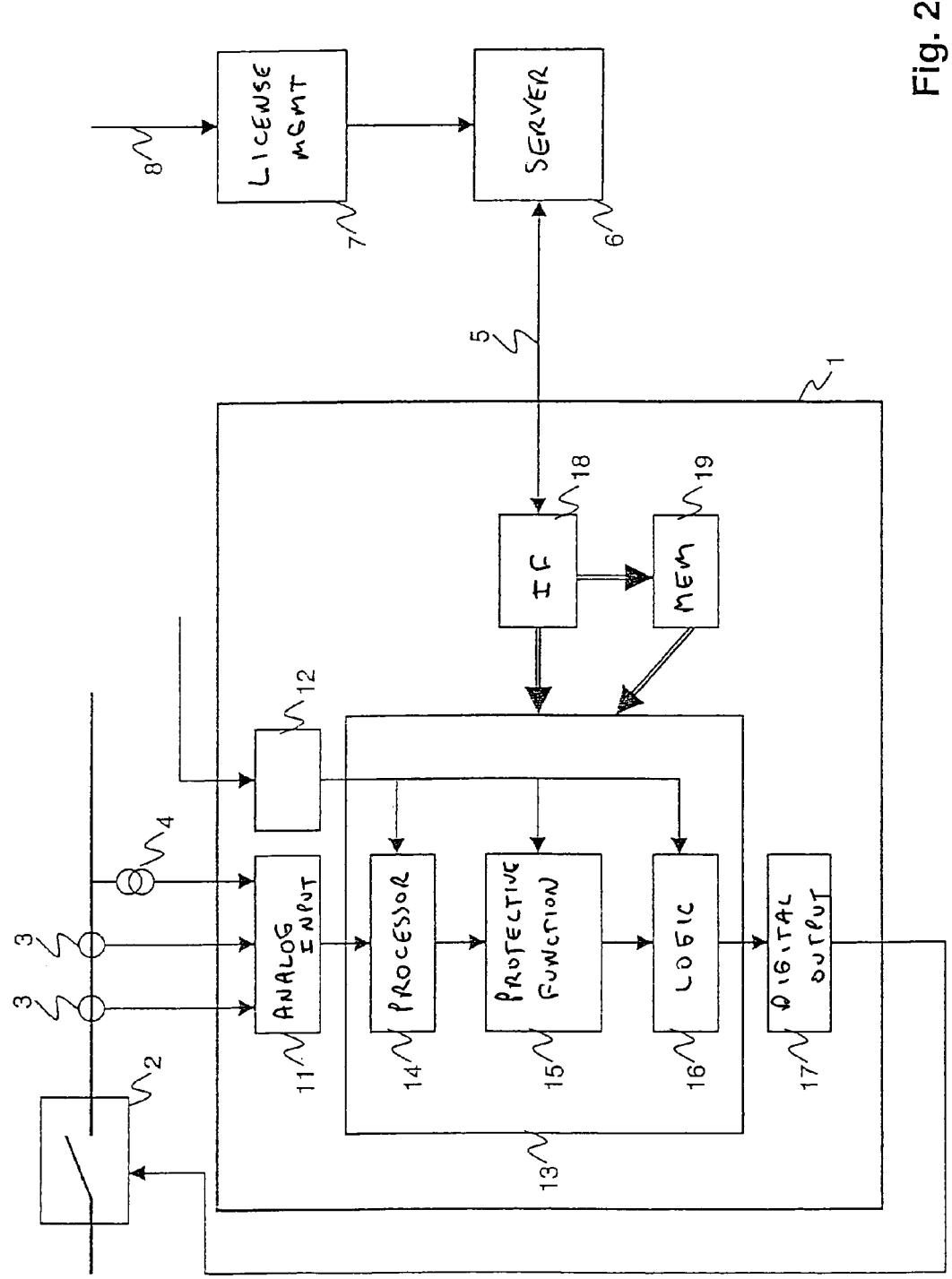
FIG. 2 shows, schematically, a protective device according to the invention, and its environment.

FIG. 2 shows, schematically, a protective device 1 according to the invention for a substation, and its environment. Signal conditioning 11 detects measurement signals from current measurement appliances 3 and voltage measurement appliances 4 for the power distribution network, in particular a switchgear assembly. The signal conditioning 11 carries out conditioning and analog/digital conversion of the measurement signals, and transmits appropriate digitally coded measured values to programmable logic 13. The programmable logic 13 has measured value processing 14 for filtering measured values and for calculating, for example, the power from the voltage and current. Filtered and calculated measured values such as these are supplied to a protective function core 15, which provides a more or less complex core for the protective function. Digital inputs 12 for selection of protective functions, control of the measured value pre-processing or for suppression of switching commands are likewise applied to the programmable logic 13. During operation of the protective device 1, the protective function core 15 determines whether a disturbance has occurred and whether a switching command should be set to an associated primary appliance, in this example a switch 2. A switching command such as this is transmitted to protection logic 16, which optionally links it with other digital signals, in particular with inhibit signals, which can prevent the switching command from being passed on. An appropriate output signal from the protection logic 16 is converted in a digital output 17, and is supplied to the switch 2. This is done, for example, by means of specially associated lines such as optical waveguides, or via a process bus YW2.

In one preferred embodiment of the invention, the protective device 1 has a communication interface 18, which is used for communication with a function server 6 via a communication link 5. The communication link 5 is, for example, a temporary point-to-point link or a link based on an Internet Protocol such as http or with FTP, or TelNet. The links are preferably based on the known TCP/IP Internet protocol.

The function server 6 stores two or more different protective functions, and/or their description. This description can be transmitted to the protective device 1 via the communication link 5, and can be loaded and carried out in the programmable module 13, depending on a licence status. In one preferred embodiment of the invention, the licence status is determined and managed by a licence management means 7, and is transmitted to the function server 6 as required. The licence status includes the information for each relevant protective device 1 as to what protective function may be used or should be carried out in what time period, that is to say between predetermined start and end times.

The licence management means 7 is a computer program for determining and managing the licence status: it preferably offers a user interface 8 for modification of the licence status. In one preferred embodiment of the invention, the user interface 8 is accessible to a network operator via a communication network such as the Internet or World Wide Web. In this case, the selection of a specific protective function is linked to the payment of a licence fee: the licence status for the protective function then allows the protective function to be used, that is to say transmission of the description of the protective function to the protective device 1 and/or loading of the description in the programmable module 13, only when the licence management means 7 receives confirmation of payment of the licence fee.

The function server 6 and the licence management means 7 are each implemented as computer programs on different or on the same data processing unit or units, and with associated data memories. They are preferably under the control of and in the premises of a manufacturer of the protective device 1, and are provided by this manufacturer with new protective functions.

According to the invention, the programmable logic 13 has a programmable digital logic module, which typically operates at least partially on an unlocked basis. This is, for example, a FPGA (Field Programmable Gate Array) a PLA (Programmable Logic Array) or a CPLD (Complex Programmable Logic Device). Embodiments of FPGAs are known as "symmetrical array", "row-based", "hierarchical PLD" and "sea-of-gates". Known technologies are solid-state RAM cells, "anti-fuse", EPROM transistors and EEPROM transistors. Further embodiments of modules with programmable logic additionally have a microprocessor and/or means for reprogramming the logic part.

The individual blocks comprising the measured value processing 14, protective function core 15 and protection logic 16 for the protective function are in each case described in a standard hardware description language such as VHDL (VHSIC Hardware Description Language), Verilog or System-C. In. another preferred embodiment of the invention, the individual blocks of the protective function are described by a bit stream. The bit stream is loaded in a known manner in the programmable logic 13, or the FPGA or CPLD, in order to cause the programmable logic 13 to implement a specific hardware design corresponding to the desired function. The description of the protective function which is transmitted to the protective device 1 by the function server 6 is thus a description of a hardware design which, depending on the embodiment of the invention, assumes the form of a bit stream or the form of a hardware description language. The description is preferably transmitted from the function server 6 to the protective device 1 in a scrambled form.

In one preferred embodiment of the invention, the measured value processing 14 and the protection logic 16 are implemented together with the protective function core 15 in the programmable logic 13. In another preferred embodiment of the invention, the measured value processing 14 and/or the protection logic 16 are not implemented in the programmable logic 13, but in separate modules.

Different variants of implementations of the individual blocks comprising the measured value processing 14, protective function core 15 and protection logic 16 are preferably stored in function libraries for the function server 6, and can be configured and combined for a specific application.

In a further preferred embodiment of the invention, the signal conditioning 11 and/or the digital output 17 are not part of the protected device 1, but are implemented in separate appliances. These separate appliances transmit the digitally coded measured values to the measured value processing 14 and/or receive the output signals from the protection logic 16, for example via a process bus YW2.

In one preferred embodiment of the invention, the protective device 1 has a function memory 19 in which one or more descriptions of protective functions can be stored. This allows a loaded protective function to be replaced by the loading of a different protective function which is stored in the function memory 19, without the protective functions having to be transmitted via the communication link 5. A command to replace the protective functions can in this case be initiated either locally on the protective device or by remote control via the control station KA0, or via the communication link 5. However, a command such as this can also be initiated, for example, on a timer-controlled basis: this allows a protective function to be transmitted via the communication link 5, to be stored in the function memory 19, and not to be loaded into the programmable logic 13 until a predetermined time. In a further preferred embodiment of the invention, a basic protective function, which implements predetermined minimal protection, is stored in the function memory 19. If a licence for a loaded protective function has elapsed on the basis of the licence status, the basic protective function is loaded automatically.

LIST OF REFERENCE SYMBOLS

1 Protective device
2 Primary appliance, switch
3 Current measurement appliance
4 Voltage measurement appliance
5 Communication link
6 Function server
7 Licence management means
8 User interface
11 Analog input, signal conditioning
12 Digital input
13 Programmable logic
14 Measured value processing
15 Protective function core
16 Protection logic
17 Digital output
18 Communication interface
19 Function memory
QA1 Switch
QB1 Isolator
X1,X2,X3 Voltage sensor
YW1 High-level bus
YW2 Process bus
KA1 Controller
FA1 Protective device
KB1 Input/output appliance

The invention claimed is:

1. A protective device for an electrical power distribution network, with the protective device having means for processing of measured values from measurement appliances for the power distribution network, means for initiating switching commands by primary appliances for the power distribution network, as well as a programmable protective function which, when it is carried out, determines the switching commands on the basis of the measured values, wherein the protective device has programmable logic which can be programmed in order to carry out the protective function,
wherein the programmable logic is programmed in order to carry out a first protective function, and the protective device has means for programming the programmable logic in order to carry out a second protective function, and
wherein a license management means is provided for determining and managing a license status, which includes information for the protective device as to what protective function may be used or should be carried out in what time period,
wherein the license management means is a computer program for determining and managing the license status, which offers a user interface for modification of the license status,
wherein the user interface is accessible to a network operator via a communication network, and
wherein the selection of a specific protective function is linked to a payment of a license fee.

2. The protective device as claimed in claim 1, which has means for receiving a description of a protective function via a communication link and means for loading the description in the programmable logic.

3. The protective device as claimed in claim 2, with the means for receiving having an interface to a communication network based on the TCP/IP protocol.

4. The protective device as claimed in claim 1, with the programmable logic being an FPGA (Field Programmable Gate Array) or a CPLD (Complex Programmable Logic Device).

5. The protective device as claimed in claim 4, wherein a description of the protective function is a VHDL (VHSIC Hardware Description Language) description or a bit stream description of a hardware design for carrying out the protective function on the programmable logic.

6. A substation for an electrical power distribution network having a protective device as claimed in claim 1.

7. The protective device as claimed in claim 1, wherein the means for programming is configured to reprogram the programmable logic to carry out the second protective function, the means for programming being configured to reprogram the protective device after its installation in the electrical power distribution network.

8. The protective device as claimed in claim 1, wherein the license status for the protective function allows the protective function to be used by transmission of a description of the protective function to the protective device and/or by loading of the description in the programmable logic, only when the license management means receives confirmation of payment of the license fee.

9. The protective device as claimed in claim 1, wherein a description of the respective protective function is a description of a hardware design.

10. A protective device for an electrical power distribution network, with the protective device having means for processing of measured values from measurement appliances for the power distribution network, means for initiating switching commands by primary appliances for the power distribution network, as well as a programmable protective function which, when it is carried out, determines the switching commands on the basis of the measured values, wherein the protective device has programmable logic which can be programmed in order to carry out the protective function, wherein the programmable logic is programmed in order to carry out a first protective function, and the protective device has means for programming the programmable logic in order to carry out a second protective function, and wherein a license management means is provided for determining and managing a license status, which includes information for the protective device as to what protective function may be used or should be carried out in what time period, and wherein a basic protective function, which implements predetermined minimal protection, is stored in a function memory, and if a license for a loaded protective function has elapsed on the basis of the license status, the basic protective function is loaded automatically.

11. A method for installation of a protective function in a protective device for an electrical power distribution network, wherein the protective device has means for processing measured values from measurement appliances for the power distribution network, and means for initiating switching commands by primary appliances for the power distribution network, and the protective function, when it is carried out, determines the switching commands on the basis of the measured values, wherein the method has the following steps:

transmission of a description of the protective function via a communication link to the protective device, programming of programmable logic in the protective device on the basis of the description of the protective function, and carrying out the protective function by means of the programmable logic only when a license management means receives confirmation of payment of a license fee, wherein a basic protective function, which implements predetermined minimal protection, is stored in a function memory, and if a license for a loaded protective function has elapsed on the basis of the license status, the basic protective function is loaded automatically.

12. The method as claimed in claim 11, wherein the description of the protective function is a VHDL (VHSIC Hardware Description Language) description or a bit stream description of the hardware design for carrying out the protective function on the programmable logic.

13. The method as claimed in claim 11, wherein the description of the protective function is transmitted via a communication network using the TCP/IP protocol.

14. The method as claimed in claim 11, wherein the programming of programmable logic is performed in the protective device while the protective device is installed in the electrical power distribution network.

15. The method as claimed in claim 11, wherein the description of the protective function is in the form of a description of a hardware design.

16. A protective device for an electrical power distribution network, comprising:

means for processing measured values from measurement appliances for the electrical power distribution network;

means for initiating switching commands by primary appliances for the power distribution network;

a protective function means which determines the switching commands on the basis of the measured values;

a license management means for determining and managing a licence status, which includes information for the protective device as to what protective function may be used or should be carried out in what time period; and a function memory storing a basic protective function for implementing a predetermined minimal protection, wherein the protective function means includes a programmable logic which can be programmed in order to carry out a protective function, wherein the programmable logic is programmed in order to carry out a first protective function, and the protective device has means for programming the programmable logic in order to carry out a second protective function, and wherein the protective device has means for automatically loading the basic protective function if a license for a loaded protective function has elapsed on the basis of the license status.

* * * * *